United States Patent [19]

Loschelder

[11] Patent Number: 5,933,916
[45] Date of Patent: Aug. 10, 1999

[54] HANDLE CUSHIONING INSERT

[75] Inventor: Todd C. Loschelder, Macedonia, Ohio

[73] Assignee: Moen Incorporated, North Olmsted, Ohio

[21] Appl. No.: 08/927,475

[22] Filed: Sep. 11, 1997

[51] Int. Cl.$^6$ .................................................. F16K 31/60
[52] U.S. Cl. .................... 16/110 R; 16/114 R; 16/111 R; 16/DIG. 6; 16/DIG. 24; 74/543
[58] Field of Search ............................. 16/110 A, 114 A, 16/116 R, 118, 111 R, 121, DIG. 6, DIG. 24, DIG. 40, DIG. 41, DIG. 18; 137/378; 251/292, 293; 74/548, 553, 543

[56] References Cited

U.S. PATENT DOCUMENTS

| 312,940 | 2/1885 | Whitlock ................................... 16/118 |
| D. 325,772 | 4/1992 | Carr . |
| D. 327,532 | 6/1992 | Ko . |
| D. 364,216 | 11/1995 | Hill et al. . |
| 1,475,654 | 11/1923 | Shea ........................................... 16/121 |
| 1,644,630 | 10/1927 | Binkele ..................................... 16/118 |
| 2,537,362 | 1/1951 | Mattoon ................................ 16/110 A |
| 3,990,013 | 11/1976 | Badger . |
| 4,349,940 | 9/1982 | Fleischmann et al. ................ 16/110 R |
| 4,616,673 | 10/1986 | Bondar ..................................... 16/121 |
| 4,794,945 | 1/1989 | Reback ..................................... 16/121 |
| 5,257,645 | 11/1993 | Scully et al. ............................ 251/293 |
| 5,797,422 | 8/1998 | Tokarz ................................ 16/DIG. 40 |

FOREIGN PATENT DOCUMENTS

| 0480799 | 4/1992 | European Pat. Off. ............. 16/114 A |
| 1159161 | 7/1969 | United Kingdom ..................... 16/121 |

*Primary Examiner*—Chuck Y. Mah
*Assistant Examiner*—Donald M. Gurley
*Attorney, Agent, or Firm*—Dorn, McEachran, Jambor & Keating

[57] ABSTRACT

A faucet handle has a generally cylindrical ceramic body, with a bore extending axially through the body. A mounting member extends through the bore and has an enlarged head on the exterior end thereof. The interior end of the mounting member has threads for attachment to the faucet control member. There is a cylindrical chamber formed between the exterior of the mounting member and the surface of the bore and there is an axially extending cushioning insert positioned within the chamber. The insert extends substantially about the mounting member within the chamber and is there to prevent damaging contact between the mounting member and the ceramic body.

5 Claims, 1 Drawing Sheet

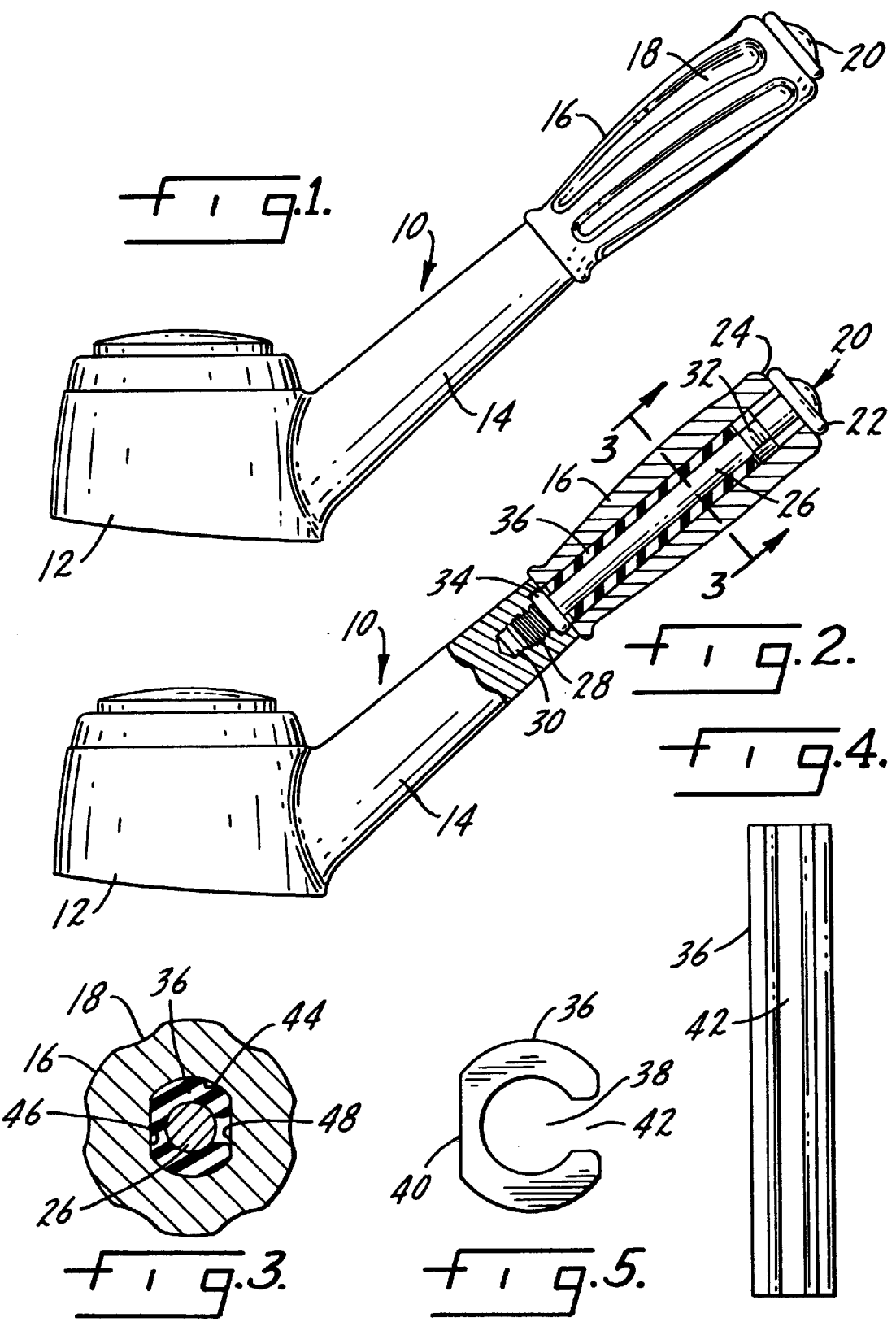

HANDLE CUSHIONING INSERT

THE FIELD OF THE INVENTION

The present invention relates to faucets and more particularly to faucet handles. There are numerous types of ceramic, generally cylindrical, faucet handles sold in today's plumbing market and most, if not all, of such handles have a metal bolt-like insert which is used to attach the handle to the faucet control member. If the faucet handle should be dropped, either in installation, assembly, or at some other time, it often happens that the attaching metal insert causes damage to the ceramic body of the faucet handle with the result that the handle must be discarded as damaged goods. The present invention provides a cushioning insert between the ceramic faucet handle and the member which attaches the handle to the faucet control member.

SUMMARY OF THE INVENTION

The present invention relates to faucet handles and more particularly to a ceramic faucet handle having a cushioning insert.

A primary purpose of the invention is to provide a ceramic handle for a faucet in which there is a cushioning insert between the handle and the mounting member which extends axially through the handle.

Another purpose is a ceramic handle having cushioning means thereon to prevent damage caused by contact between the metal mounting member and the ceramic handle.

Other purposes will appear in the ensuing specification, drawings and claims.

BRIEF DESCRIPTION OF THE DRAWINGS

The invention is illustrated diagrammatically in the following drawings wherein:

FIG. 1 is a side view of the handle of the present invention as attached to a faucet control member;

FIG. 2 is a side view, similar to FIG. 1, in part section, showing the handle, the attaching member and the handle insert;

FIG. 3 is a section along plane 3—3 of FIG. 2;

FIG. 4 is a side view of the cushioning insert; and

FIG. 5 is an end view of the cushioning insert.

DESCRIPTION OF THE PREFERRED EMBODIMENT

In today's plumbing market there are numerous faucet designs which include a ceramic handle as a part of the faucet control member, whether it be a single lever faucet or a two handle faucet. The ceramic handles are customarily attached to a portion of the faucet control member by a metal mounting member which usually has the configuration of a bolt. If in assembly or installation the ceramic handle is dropped, often the contact between the metal mounting member and the ceramic handle causes damage to some or all of the ceramic material. Such damage can either be a crack, a total breakage of the handle, or a breaking off of a portion of the handle, any one of which renders the handle damaged goods and thus unacceptable for use and sale. The present invention is specifically directed at providing a cushioning insert to prevent such damaging contact between the ceramic handle and the attaching or mounting member.

In FIG. 1, there is shown a faucet control member 10 which would be used for a single lever faucet. As indicated above, the invention is equally applicable to two handle faucets. The control member 10 includes a body 12 and an extension 14, the outer end of which is formed by a ceramic handle 16. As shown, the handle 16 has a series of flutes 18 which are slightly arcuate in form. There are flutes on handles of this type which are axial in direction and the mounting member and its cushioning insert would be equally applicable to a ceramic handle having arcuate flutes, straight flutes or no flutes at all.

The ceramic handle 16 and its mounting member are shown more particularly in FIG. 2. The mounting member 20 has an enlarged head 22 which, as shown in FIG. 2, will overlie the flat end 24 of the ceramic handle 16. The mounting member 20 has a shaft 26 terminating in a threaded section 28, which will be received in a mated threaded bore 30 in the handle extension 14. Seal 34 seals the threaded connection from fluids to prevent corrosion and provides friction to prevent untorquing of the ceramic handle. Most bolted assemblies can be torqued to higher loads to prevent unscrewing. Since ceramic is a more brittle material, high torque loads cannot be achieved during assembly, thus the need for an anti-torque device.

The mounting member 26 has a stop 32 adjacent its outer end and there may be a sealing O-ring 34 mounted on the threaded portion 28 to form a seal where the ceramic handle 16 mounts to the handle extension 14.

An elastomeric insert is indicated in FIGS. 3, 4 and 5. The insert 36 has an axially extending bore 38, a flat side 40 and a gap 42 diametrically opposed to the flat side 40. As particularly shown in FIG. 3, the bore 44 within the ceramic insert 16 has a first flat side 46 and a second flat side 48. In cross section this shape is commonly known as a double D configuration. The flat side 40 of the cushioning insert 36 will bear against the flat side 46 of the bore 44 in the ceramic handle 16. The open gap 42 will face the flat side 48 of the bore 44. The axially extending bore 38 in the insert will accept the mounting member 26 and as shown in FIG. 3, the cushioning insert will be pressed against the mounting member and will substantially fill the cavity or chamber formed between the outer surface of the mounting member and the exterior wall of the bore 44. The axial gap in the elastomeric insert provides for ease of installation and accommodates the normal tolerance in the diameters of the mounting member and the axially extending bore in the ceramic handle 16.

The invention is particularly important in terms of providing a cushioning insert for a ceramic handle so as to prevent damage to the handle in the unlikely event the handle is dropped during installation or assembly. Further, the cushioning insert eliminates any wobble or undesired movement between the handle and its mounting member. The stop 32 on the mounting member provides an end surface against which the insert will be placed, with the other end of the insert being held against the facing end surface of the handle extension 14. Thus, the insert is confined at its ends and at its exterior by the bore in the ceramic handle and at its interior by the mounting member. The cushioning insert thus fills the cavity formed between the mounting member and the ceramic handle providing a secure mounting and one which eliminates undesirable contact between the mounting member and the ceramic handle.

Whereas the preferred form of the invention has been shown and described herein, it should be realized that there may be many modifications, substitutions and alterations thereto.

The embodiments of the invention in which an exclusive property or privilege is claimed are defined as follows:

1. A faucet handle including a ceramic generally cylindrical body, a bore extending axially through said body and having an interior surface, a mounting member extending through said bore and having a periphery and an enlarged head on an exterior end thereof, an interior end of said mounting member having an attaching configuration thereon, a generally cylindrical chamber between the periphery of said mounting member and the interior surface of said bore, and an axially extending elastomeric cushioning insert positioned within said chamber and extending substantially about said mounting member within said chamber, said bore interior surface having a first flat side wall and a second flat side wall, said cushioning insert having a flat side mating with said first flat side wall and an axially extending gap facing said second flat side wall.

2. The faucet handle of claim 1 including a seal ring on said mounting member exteriorly of said generally cylindrical body.

3. The faucet handle of claim 1 wherein said mounting member has a stop axially positioning said insert thereon.

4. The faucet handle of claim 1 wherein said generally cylindrical body has a curved fluted exterior thereon.

5. The faucet handle of claim 1 wherein said attaching configuration on said mounting member includes a plurality of threads.

* * * * *